WILLIAM E. RAY
INVENTOR.

BY Claude Funkhouser
ATTORNEY

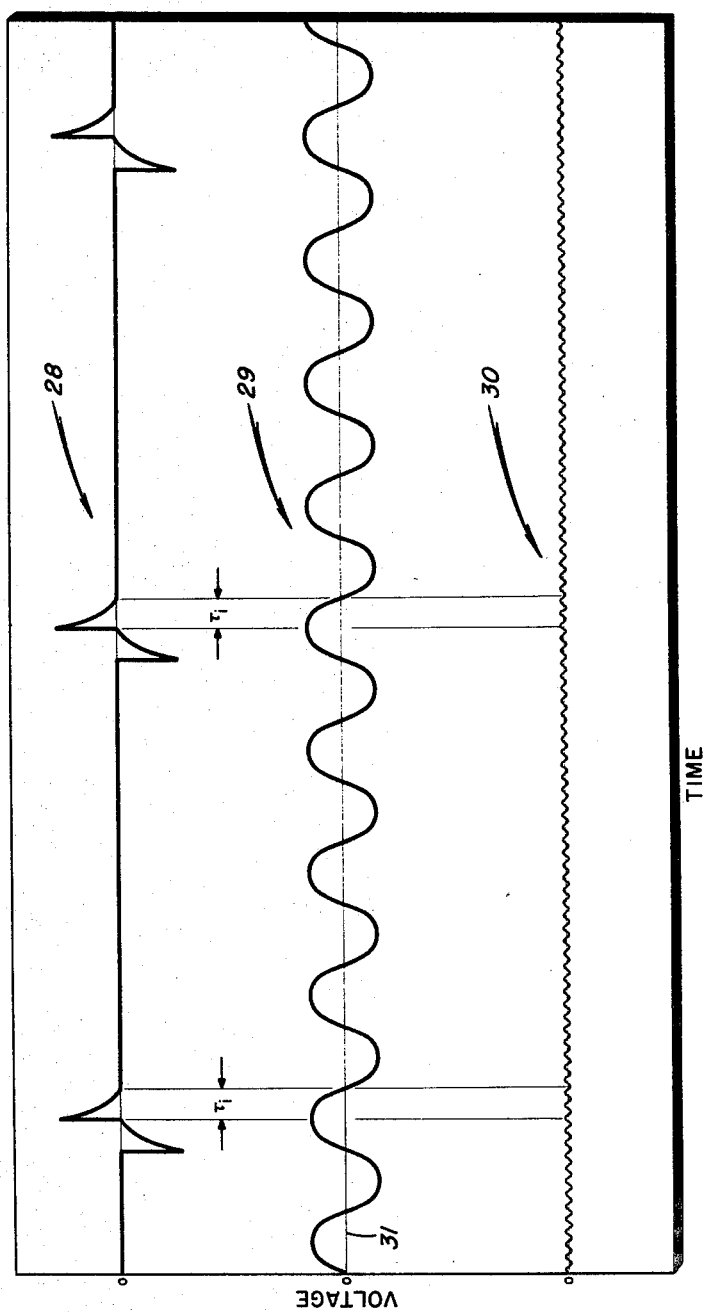

United States Patent Office 3,416,083
Patented Dec. 10, 1968

---

3,416,083
PHASE COMPARATOR UTILIZING
LOGIC CIRCUITRY
William E. Ray, Sykesville, Md., assignor to the United States of America as represented by the Secretary of the Navy
Filed Jan. 23, 1964, Ser. No. 339,823
13 Claims. (Cl. 324—83)

This invention relates generally to phase monitoring networks and more specifically to an improved phase comparator utilizing logic circuitry.

Many developments in time and frequency measurement have taken place in recent years. Rapidly advancing technology has necessitated the development of increasingly accurate measurement techniques, for precise measurement provides a basis for further advancement as well as for quantitatively finding out the characteristics of that which is to be measured, for the benefit of future experimenters.

The recent advent of the electronic counter, having its own highly stable internal oscillator, permitted the comparison of relative signal phase angles to an accuracy of one part in a million. But even so refined a degree of accuracy was destined to become inadequate for the increasing demands of modern technology. What was needed was an increase in the accuracy of relative signal phase angle determination of one, two, or wishfully three orders of magnitude. The instant invention sets forth a means for quantitatively measuring relative signal phase angles to an accuracy of one part in one hundred million and, by using the finest existing components today, even one part in a billion, i.e., $1/10^9$.

It is an object of this invention to provide a phase comparator utilizing logic circuitry for relative signal phase angle determination.

It is another object of this invention to provide a phase comparator utilizing logic circuitry and capable of digitally monitoring incoming signals and thereby determining their relative phase angles.

It is a further object of this invention to provide a phase comparator utilizing logic circuitry and capable of providing a printed record of the relative phase angles of digitally monitored incoming signals.

A still further object of this invention is to provide, in a phase comparator utilizing logic circuitry, means for digitally monitoring signals whose frequencies vary over a wide range, and recording their relative phase angles.

And another object of this invention is to provide, in a phase comparator utilizing logic circuitry, means for digitally monitoring incoming signals and determining and recording their relative phase angles to an accuracy of up to one part in a billion, i.e., $1/10^9$.

The attendant advantages of this invention will be better appreciated and said invention will become clearly understood by reference to the following detailed description and accompanying drawings illustrating one embodiment of the instant invention, wherein:

FIG. 2 is a hypothetical illustration of a plurality of signal waveforms.

Figure 1:
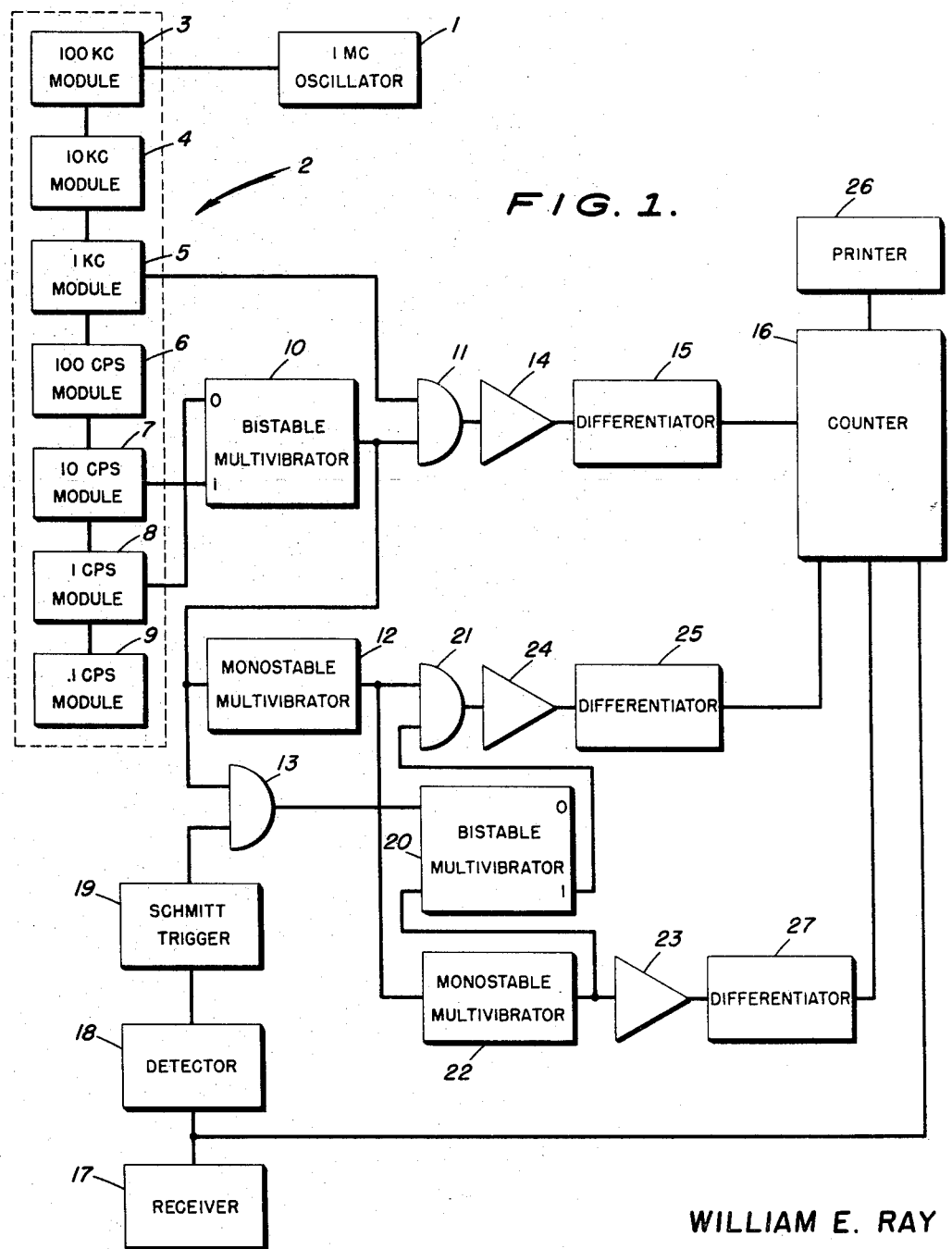
FIG. 1 is a functional block diagram of the instant invention.

Referring to the drawings in more detail, and more specifically to FIG. 1, a stable oscillator, such as a stable one megacycle oscillator, is shown at 1, providing a one megacycle signal to a decade divider 2, such as manufactured by the Digital Equipment Corporation. The divider module 2 includes a 100 kc. divider module 3 which scales the one megacycle signal from oscillator 1 down to 100 kc., and feeds said 100 kc. signal to a 10 kc. divider module 4. Said divider module 4 scales down said 100 kc. signal to a 10 kc. signal which it supplies to a 1 kc. divider module 5. The divider module 5 scales down said 10 kc. signal to 1 kc. and feeds it to a 100 c.p.s. divider module 6. In a like manner divider module 6 scales down the 1 kc. signal to a 100 c.p.s. signal which is fed in turn to a 10 c.p.s. divider module 7, a 1 c.p.s. divider module 8 and a .1 c.p.s. module 9, which each in turn scale down said 100 c.p.s. signal by factors of 10 to 10 c.p.s., 1 c.p.s. and .1 c.p.s., respectively.

It is important to emphasize at this point that said decade divider 2 need not contain the various divider modules described hereinabove. There may be more or less divider modules present than illustrated in the particular embodiment of the instant invention herein described. However, because each divider module scales down its impressed signal by a factor of ten, the incoming signal to the decade divider 2 and the lowest frequency output desired will determine the number of divider modules required.

The decade divider 2 is such that the output pulses from each divider module have the positive going edges of the pulses they emit, marking whole second intervals, in synchronism.

As best seen in FIG. 1, the 1 p.p.s. of the 1 c.p.s. divider module 8 is fed to a bistable multivibrator 10, and the 10 p.p.s. output of the 10 c.p.s. divider module 7 is fed to said same bistable multivibrator 10. Said bistable multivibrator 10 has two stable states which can be designated state zero and state 1. The positive going edge of one of the pulses in the 1 p.p.s signal, from the 1 c.p.s. divider module 8, switches bistable multivibrator 10 to the zero state.

The positive going edge of one of the pulses in the 10 p.p.s. signal from the 10 c.p.s. divider module 7 switches said bistable multivibrator 10 to the one state. Since it was previously mentioned hereinbefore that the positive going edges of the pulses, marking whole second intervals, throughout the decade divider 2 are in synchronism, it is natural to question how said bistable multivibrator 10 can be switched from the one state to the zero state. Although a positive going edge of a pulse from both said 1 p.p.s. signal and said 10 p.p.s. signal will always reach said bistable multivibrator 10 at the same time (when said multivibrator is in the one state) said bistable multivibrator 10 will only be able to "see" the signal tending to change its present state, and will be switched thereby.

It can now be readily seen that bistable multivibrator 10 will go into state zero once each second and be switched to state one in one-tenth of a second thereafter, thus providing an output pulse, when switched from the zero state to the one state, of a duration of one-tenth of a second. Said bistable multivibrator 10 output pulse is sent to an "and" gate 11 and a monostable multivibrator 12 and an "and" gate 13.

The 1 kc. divider module 5 sends a one thousand p.p.s. signal to the "and" gate 11. The pulse output of the bistable multivibrator 10, when said bistable multivibrator 10 is switched from the zero state to the one state, is necessary for the creation of an "and" condition at the "and" gate 11 for one-tenth of a second every second. Thus, one hundred pulses from said 1 kc. divider module 5 will pass through "and" gate 11 each second at a frequency of one thousand c.p.s. The output signal of said "and" gate 11 is fed to an emitter follower 14 which serves as a buffer amplifier. The output signal from said emitter follower 14 is fed to a differentiating network 15 which serves to shape said emitter follower 14 output signal so as to put it in a form suitable for triggering the "start" of a time interval counter 16, such as a Hewlett Packard one megacycle counter.

It is evident in the light of the above teachings that the input signals to the bistable multivibrator 10 control the length of time and frequency during which the "and"

gate 11 is permitted to pass signals from the 1 kc. divider module 5, which in turn determines the number of pulses which will pass through said "and" gate 11.

The basic concept having been introduced, it is now appropriate to point out that the combination of the divider modules 7 and 8 sending signals to the bistable multivibrator 10, and the divider module 5 sending signals to the "and" gate 11, was chosen merely for illustrative purposes. Any two divider modules can be used to send signals to the bistable multivibrator 10, provided that the divider module of lower frequency controls the zero state of said bistable multivibrator 10 and the divider module of higher frequency controls the one state of the bistable multivibrator 10. The 1 kc. divider module 5 feeding the "and" gate 11 can be replaced by any of the other divider modules, with an exception to be mentioned later on, thus providing a wide choice of sampling time intervals and sampling frequencies for the "and" gate 11 as well as a wide choice of the number of pulses that said "and" gate 11 will pass during the sampling time interval.

A radio receiver, such as model 500 R manufactured by the I.C.F. Corp., is shown at 17. The input to said receiver is the signal whose phase, relative to the phase of the signal from said one megacycle stable oscillator 1 it is desired to measure.

The output signal from said receiver 17 is sent to the counter 16, and to a detector circuit 18. Said detector circuit 18 senses whether there is a signal present at the output of said receiver 17 and produces an output signal which is developed from the envelope of the signal output of the receiver 17.

The output signal of the detector circuit 18 is fed to a Schmitt trigger 19 which serves to shape said signal so as to provide very fast rise and fall times for the leading and trailing edges of said detected signal, respectively.

The output signal of the Schmitt trigger 19 is fed to the "and" gate 13. As previously mentioned hereinabove, the 1 p.p.s. output signal, having a duration of one-tenth of a second, of the bistable multivibrator 10 is also fed to said "and" gate 13.

It is essential to point out that the characteristics of said "and" gate 13 and said Schmitt trigger 19 are such that when operatively connected within the phase comparator network, in a well-known manner, said "and" gate 13 will be placed in an "and" condition only in the absence of a signal from the receiver 17 and the presence of said 1 p.p.s signal from the bistable multivibrator 10, though, prima facie, it would appear that said "and" condition would occur only when a signal from the receiver 17 were present along with said 1 p.p.s. signal from the bistable multivibrator 20, i.e., when there is an "and" condition at is sent to a bistable multivibrator 20 which can be characterized as having two stable states, i.e., zero and one. The "and" gate 13 controls the zero state of said bistable multivibrator 20, i.e., when there is an "and" condition at "and" gate 13 a signal will be sent to the bistable multivibrator 20 and will flip it to the zero state.

As previously mentioned, the pulse signal output of the bistable multivibrator 10 is fed to the monostable multivibrator 12.

Said signal output of the bistable multivibrator 10, having a pulse duration of one-tenth of a second, triggers the monostable multivibrator 12 which emits a pulse having a duration of two-tenths of a second and thus serves to delay the impressed signal from the bistable multivibrator 10. The pulse output of said monostable multivibrator 12 is fed to the "and" gate 21 and the monostable multivibrator 22.

Said monostable multivibrator 22 emits a pulse having a duration of two-tenths of a second and thus serves to delay the impressed signal from the monostable multivibrator 12. The output pulse signal of the monostable multivibrator 22 is fed to an emitter follower 23 and, at the same time, the bistable multivibrator 20. The output signal pulses of the monostable multivibrator 22 control the one state of the bistable multivibrator 20, i.e., the positive going edge of said signal pulses flips the bistable multivibrator 20 into the one state. When in the one state the bistable multivibrator 20 sends a signal to the "and" gate 21, which said signal, together with the output signal of said monostable multivibrator 12, serves to create an "and" condition at the "and" gate 21.

When there is an "and" condition at the "and" gate 21 the output signal of the monostable multivibrator 12 is allowed to pass through said "and" gate 21 to an emitter follower 24 which serves as a buffer amplifier. The output of said emitter follower 24 is sent to a differentiating network 25 which serves to shape said emitter follower 24 output signal so as to put it in a form suitable for triggering the "print" control of the time interval counter 16 which in turn, as shown in FIG. 1, triggers a printer 26, such as is manufactured by the Hewlett Packard Corp. The printer 26 prints out the cumulative total in the time interval counter 16.

The emitter follower 23 serves as a buffer amplifier, and its output signal is sent to differentiating network 27. Said differentiating network 27 serves to shape the output signal of the emitter follower 23 so as to put it in a form whereby it is suitable to trigger the reset function of the time interval counter 16 which resets said counter and thus clears it.

In the light of the above teachings it is obvious that when there is a signal coming from the receiver 17, there is no "and" condition at the "and" gate 13; the bistable multivibrator 20 remains in the one state; there is an "and" condition at the "and" gate 21; the time interval counter 16 receives a "print" command and causes the printer 26 to print the cumulative total present in the time interval counter 16; and said time interval counter 16 receives a "reset" command whereby it clears itself.

When there is no signal coming from the receiver 17, there is an "and" condition at the "and" gate 13; the bistable multivibrator 20 is "effectively" flipped to the zero state; there is "effectively" no "and" condition at the "and" gate 21; the time interval counter 16 receives no "print" command; the printer 26 fails to print; and the time interval counter 16 still receives "reset" commands and clears itself.

It is to be noted that hereinabove it was mentioned that the bistable multivibrator 20 is "effectively" flipped to the zero state and there is "effectively" no "and" condition present at the "and" gate 21 when there is no incoming signal from said receiver 17. This was done for the purpose of illustrating the over-all functions present. Actually, when there is no incoming signal from the receiver 17, the bistable multivibrator 20 will be flipped to the zero state by signals from the bistable multivibrator 10, but said bistable multivibrator 20 will be flipped back to the one state by signals from the monostable multivibrator 22. When the bistable multivibrator 20 is in the zero state there is no "and" condition present at the "and" gate 21 thus preventing signals from the monostable multivibrator 12 from passing through the "and" gate 21 and triggering the "print" command of the time interval counter 16. Now, with no incoming signals from the receiver 17, when the monostable multivibrator 22 flips the bistable multivibrator 20 into the one state there is emitted from said bistable multivibrator 20 the requisite signal for creating an "and" condition at the "and" gate 21, but there must be present at the "and" gate 21, at the same time, the requisite signal from the monostable multivibrator 12 in order to create an "and" condition.

The input signal to the monostable multivibrator 22 is delayed by said monostable multivibrator 22, and flips the bistable multivibrator 20 into the one state too late for its output signal to combine with the output signal from the monostable multivibrator 12 to create an "and" condition at the "and" gate 21, thus making the passage of the output signal from the monostable multivibrator 12 through the "and" gate 21 impossible. Hence, no "print" command can be received by the time interval counter 16 under these circumstances and the printer 26 cannot function.

It will be recalled that the output signal of the receiver 17 is fed to the time interval counter 16 as well as to the detector network 18. In accordance with the teachings hereinabove, it might be thought that the said counter 16 would run indefinitely. The output signal of the receiver 17 serves to stop the counter 16, as will be described shortly.

Referring now to FIG. 2, a series of pulses, hypothetically representing the output signal of the differentiating network 15, are shown at 28. The positive-going edges of said pulses 28 serve to provide the "start" command to the time interval counter 16. The "stop" commands to said counter 16 are provided by the receiver output signal which is hypothetically illustrated at 29.

It was mentioned earlier that any divider module could be used to replace the divider module 5, shown in FIG. 1, which feeds the "and" gate 11 and determines the frequency of the signal 28, with one exception, i.e., the frequency of the divider module chosen to feed signals to said "and" gate 11 must be smaller than, and integrally divisible into, the frequency of the signal output of the receiver 17. With the above exception met there will always be a positive-going edge of the signal 28 occurring at only one phase angle in a given cycle of the signal 29, provided said signal 29 does not shift its phase. Of course, for measurement purposes, it is not necessary that the positive-going edge of the signal 28 line up so that they occur at the same point or phase in each cycle of said signal 29. Indeed, since a shift in the phase of the receiver output signal, hypothetically represented at 29, is what it is desired to measure, the positive-going edges of the signal 28 may not occur at fixed phase positions within the cycles of said signal 29. The pulses of the signal 28, which are in phase with the output signal of the oscillator 1, must occur, however, with a stable frequency since they start the time interval counter 16, shown in FIG. 1, and hence serve as a time base or reference.

When a positive going edge occurs in the signal 28 the time interval counter 16, which has an internal oscillator, starts to count the pulses 30 emanating from said internal oscillator. The counter 16 is stopped when the receiver output signal 29 reaches a prescribed voltage level, such as 31 (the zero crossover level) in FIG. 2, and thus said time interval counter 16 will count for a variable time interval $\tau_1$, shown in FIG. 2. Said time interval $\tau_1$ is a function of the frequency and relative phase angle to the signal 28, of the receiver output signal 29, and since the output pulses of the internal oscillator of time interval counter 16 are stable, i.e., have a constant frequency, it is readily seen that the number of pulses of the signal 30 occurring during the variable time interval $\tau_1$ will vary with the phase and frequency of the signal 29. The frequency of the signal 29 is very stable and thus the number of pulses of said signal 30 that will be summed by the time interval counter 16, during the time interval $\tau_1$, is a function of the relative phase shift of said signal 29 to said signal 28.

Referring again to FIG. 1, it must be borne in mind that the printer 26 does not receive its "print" command until some time interval after the counter 16 is started, an obvious necessity. With the instant invention connected in the manner illustrated in the accompanying drawings, the counter 16 will be started by each of the 1 kc. pulses emitted by the divider module 5 during the one-tenth of a second that there is an "and" condition present at the "and" gate 11. Thus, the counter 16 will sum one hundred times each second within a time interval of one-tenth of a second. The printer 26 will print the total sum of the one hundred sub-sums. It is readily seen that the instant invention inherently provides an excellent means for finding an average of many readings; one must merely move the decimal two points to the left in the printed sum to obtain the average of the one hundred sub-sums.

Of course, the number of sub-sums, the frequency with which they are taken, and the time interval in which they are recorded can be varied to provide virtually any desired combination. This variability of number, frequency, and time interval of sub-sums is readily seen in the light of the aforementioned variability of the sampling time, frequency, and number of pulses passed by the "and" gate 11, which exerts control over the counter 16 through the emitter follower 14 and the differentiating network 15.

It can readily be seen that many variations and modifications of the present invention are possible in the light of the aforementioned teachings. It is therefore to be understood that within the scope of the appended claims the instant invention may be practiced in a manner otherwise than is specifically described herein.

What is claimed is:

1. In a phase comparison network the combination comprising, a first source of oscillations of fixed frequency and phase, a second source of oscillations of variable phase, means connected to said first source of oscillations for providing output pulses of a desired frequency for a desired time interval, means connected to receive signals from said pulse producing means and said second source of oscillations for repetitively producing a cyclical signal in response to pulses from said pulse producing means, terminating production of such cyclical signal in response to said second source of oscillations, and counting the average number of cycles of said cyclical signal occurring in a predetermined time interval, and means for reading out totals from said counting means.

2. In a phase comparator for measuring phase angle shifts of incoming signals relative to a standard reference signal, the combination including a stable oscillator for providing a reference signal, a decade divider connected to said stable oscillator, comprising a plurality of divider modules and capable of successively scaling down said oscillator reference signal by factors of one tenth, a bistable multivibrator connected to said decade divider and capable of receiving signals from two of said divider modules and providing an output pulse of variable duration and frequency, an "and" gate connected to said decade divider and said bistable multivibrator for passing a predetermined number of pulses from any divider module in said decade divider, means for differentiating impressed signals so as to suitably shape them for triggering desired commands, a radio receiver for receiving signals for relative phase determination, a detector network connected to said radio receiver for receiving signals therefrom and detecting the envelope of said signals, a time interval counter connected through said differentiating means to said "and" gate and directly connected to said radio receiver so as to start upon receiving a signal from said "and" gate and stop upon receiving a signal from said radio receiver while accumulating and storing successive time intervals, a printer connected to said time interval counter for printing totals accumulated and stored in said counter, a Schmitt trigger connected to said detector for shaping signals therefrom to provide them with fast rise and fall times, a second "and" gate connected to said time interval counter for providing print command signals therefor, a second bistable multivibrator connected to said second "and" gate for providing control signals therefor, a third "and" gate operatively connected to said Schmitt trigger, said first bistable multivibrator and said second bistable multivibrator for providing control signals for said second bistable multivibrator in response to signals from said first bistable multivibrator and said Schmitt trigger,
a first monostable multivibrator connected to said first bistable multivibrator and said second "and" gate for receiving signals from said first bistable multivibrator and providing delayed output signals for said second "and" gate, and
a second monostable multivibrator operatively connected to receive signals from said first monostable multivibrator and supply delayed output signals to said second bistable multivibrator, and "reset" command signals to said time interval counter.

3. A phase responsive circuit arrangement comprising in combination,
a first source of oscillations of fixed frequency and phase,
a second source of oscillations of variable phase,
means connected to said first source of oscillations for sequentially dividing down its frequency by factors of one tenth and providing a plurality of discrete rectangular pulse output signals each having a frequency which when divided into the frequency of said first source of oscillations will yield an integral power of ten,
multivibrator means connected to said dividing means to receive two different frequency signals therefrom and controlled thereby for providing an output pulse of variable duration and frequency,
gating means connected to said multivibrator means and said dividing means for receiving and transmitting a discrete number of pulses from said dividing means of a frequency integrally divisible into that of said second source of oscillations, and
counting means connected to said gating means and said second source of oscillations whereby signals from said gating means will repetitively cause said counter means to commence production of oscillations and cumulatively count said oscillations, and signals from said second source of oscillations will repetitively cause said counter means to terminate production of oscillations.

4. A phase responsive circuit as set forth in claim 3, additionally including means for clearing and resetting said counter means.

5. The invention as recited in claim 3, wherein said second source of oscillations can have virtually any frequency, further comprising
means for causing said counting means to directly count the average phase shift between said second and first sources of oscillations.

6. A phase responsive circuit as set forth in claim 3, additionally including means for reading out cumulative counts stored in said counter means.

7. A phase responsive circuit as set forth in claim 6, additionally comprising means for triggering said readout means, and
means for clearing and resetting said counter means.

8. A phase responsive network as recited in claim 7, wherein
said triggering means includes delaying means such that said readout means will not be triggered on while said counting means is counting.

9. The invention as set forth in claim 7, wherein said triggering means comprises gating means such that said readout means will be triggered on only when a signal is present from said first source of oscillations.

10. A phase responsive network as recited in claim 9, wherein
said triggering means additionally includes delaying means such that said readout means will be triggered on only when a signal is present from said first source of oscillations and will not be triggered on until said counting means has completed a counting cycle.

11. A phase comparator utilizing logic circuitry, wherein it is possible to measure phase angle differences of incoming signals relative to a standard reference signal, including
a stable oscillator for providing a reference signal,
a decade divider connected to said oscillator comprising a plurality of divider modules and capable of scaling down said oscillator reference signal by factors of one tenth,
a first bistable multivibrator connected to two of said divider modules whereby it can emit an output pulse whose duration and frequency depends on the particular divider modules used,
a first "and" gate connected to said first bistable multivibrator, and to a third divider module which emits a frequency integrally divisible into the frequency of a signal whose phase is to be measured, for passing a variable and predetermined number of pulses from said third divider module in response to signals from said first bistable multivibrator,
a radio receiver for receiving signals whose phase it is desired to measure,
a detector network connected to said receiver for detecting signals received therefrom,
a time interval counter connected to said receiver and to said first "and" gate so that it receives start signals from said first "and" gate and stop signals from said receiver, for counting the time interval between start and stop signals,
a second "and" gate connected to said first bistable multivibrator and to said receiver through said detector for providing output pulses when signals are received from only said first bistable multivibrator,
a first monostable multivibrator connected to said first bistable multivibrator for delaying signals received therefrom,
a second monostable multivibrator connected to said first monostable multivibrator for receiving and delaying signals therefrom,
a second bistable multivibrator connected to said second "and" gate and to said second monostable multivibrator whereby signals from said second "and" gate will cause it to change to one state and signals from said second monostable multivibrator will cause it to change to a second state,
means connected to said second monostable multivibrator and to said time interval counter for shaping output pulses from said second monostable multivibrator so that they can reset said counter,
means connected to said time interval counter for reading out cumulative totals stored therein, and
a third "and" gate connected at its input to said first monostable mulitivibrator and said second bistable multivibrator and at its output to said counter, for providing print control pulses to said readout means in response to concurrent signals from said first monostable multivibrator and the second state of said second bistable multivibrator.

12. A phase comparator as recited in claim 11, wherein the predetermined number of pulses from said third divider module passed by said first "and" gate will be an integral power of ten, comprising
means for directly reading out the average phase shift on an incoming signal relative to said reference signal.

13. A phase responsive network, including
a first source of oscillations of fixed frequency and phase,
a second source of oscillations of variable phase,
means connected to said first source of oscillations for providing output pulses of a desired frequency for a desired time interval,
and means connected to receive signals from said pulse producing means and said second source of oscillations for repetitively producing a cyclical signal in response to pulses from said pulse producing means, terminating production of such cyclical signal in response to said second source of oscillations, and counting the average number of cycles of said cyclical signal occurring in a predetermined time interval.

References Cited

UNITED STATES PATENTS

| | | | |
|---|---|---|---|
| 2,928,046 | 3/1960 | Hansel | 324—78 X |
| 3,144,802 | 8/1964 | Faber et al. | 324—78 X |
| 2,949,973 | 8/1960 | Broding et al. | 340—1 |

OTHER REFERENCES

Moore: I.B.M. Technical Disclosure Bulletin, vol. 3, No. 2; July 1960, p. 35.

RODNEY D. BENNETT, *Primary Examiner.*

D. C. KAUFMAN, *Assistant Examiner.*

U.S. Cl. X.R.

340—1